UNITED STATES PATENT OFFICE.

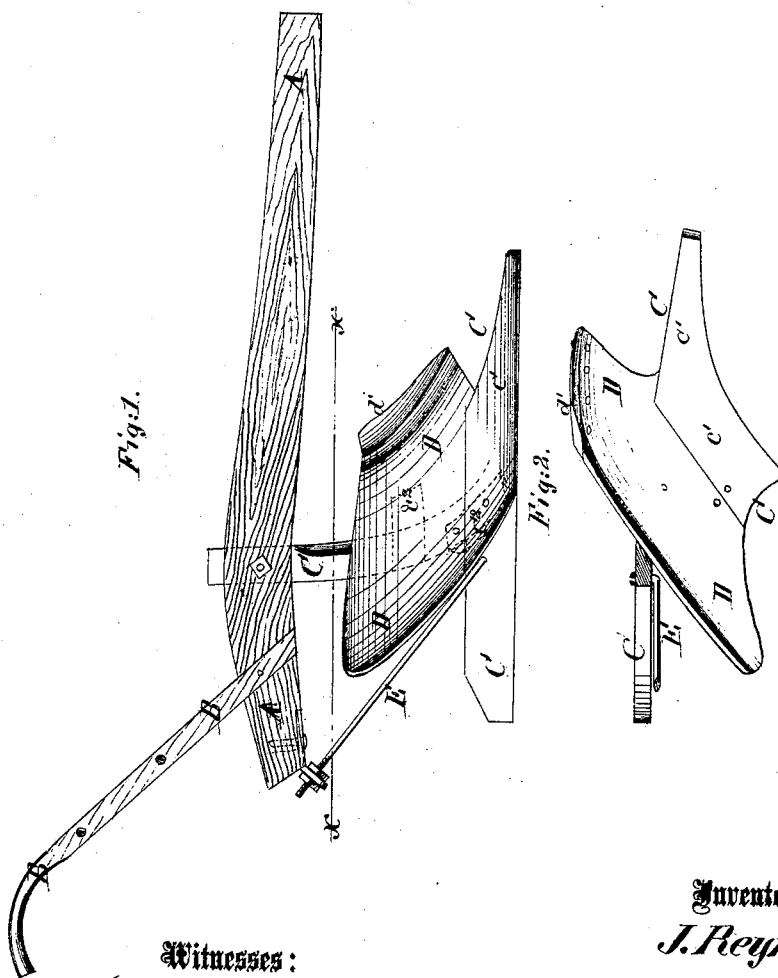

J. REYNOLDS, OF CRYSTAL SPRINGS, MISSISSIPPI.

IMPROVEMENT IN COMBINED PLOW AND SCRAPER.

Specification forming part of Letters Patent No. 94,774, dated September 14, 1869.

*To all whom it may concern:*

Be it known that I, J. REYNOLDS, of Crystal Springs, in the county of Copiah and State of Mississippi, have invented a new and useful Improvement in Combined Plow and Scraper; and I do hereby declare that the following is a full, clear, and exact description thereof, which will enable others skilled in the art to make and use the same, reference being had to the accompanying drawings, forming part of this specification, in which—

Figure 1 is a side view of my improved plow and scraper. Fig. 2 is a horizontal section of the same, taken through the line $x\ x$, Fig. 1.

Similar letters of reference indicate corresponding parts.

My invention has for its object to furnish an improved scraper for plowing and scraping cotton and corn which shall be simple in construction, effective in operation, and easily operated; and it consists in the construction and combination of various parts of the machine, as hereinafter more fully described.

A is the plow-beam, to the rear end of which are attached the handles B in the ordinary manner.

C is the standard, the upper end of which is secured to the beam A by a bolt and nut, said bolt passing through the said beam and standard.

To the forward part of the base or shoe of the standard C is attached, or upon it is formed, a point, $c'$, the wing of which is extended to form the lower part of the mold-board.

D is the mold-board or scraper, which rests upon the standard C, point $c'$, and lugs $c^2$, formed upon or attached to said standard C, to which lugs the said mold-board is securely bolted. The mold-board D is concaved, as shown in the drawings, is set inclined, and its landside end is extended about six inches, more or less. The lower edge of the extended part of the mold-board D is so formed as to be nearly parallel with the surface of the ground to be scraped. The landside edge of the mold-board D is made vertical, or nearly so, and to it is attached, or upon it is formed, a colter, $d'$, as shown in Figs. 1 and 2. The draft-strain upon the standard C is sustained by the brace-rod E, the lower end of which is secured to the lower part of the said standard C, and the upper end of which passes through the rear end of the beam A, or through a lug attached to the said beam, where it is secured in place by two nuts placed upon it, the one above and the other below the beam or lug through which the said brace-rod E passes. This allows the pitch of the plow, and consequently the depth at which it runs in the ground, to be adjusted at will. By this construction, by the combination of the plow with the scraper, the machine is held steadily to its work, so as to be much more easily guided and operated than when made without a plow, in the ordinary manner

Having thus described my invention, I claim as new and desire to secure by Letters Patent—

1. The concave mold-board scraper D, constructed as described—that is to say, with its landside end projecting substantially as specified—when used in combination with the plow C $c'$, for the purpose set forth.

2. The adjustable brace-rod E, in combination with the beam A, standard C $c'$, and mold-board scraper D, substantially as herein shown and described, and for the purposes set forth.

J. REYNOLDS.

Witnesse:
    R. A. HARRISON,
    O. C. CRUM.